Dec. 12, 1967 H. A. HELM 3,358,083

TIME-DIVISION MULTIPLEX DIGITAL TRANSMISSION ARRANGEMENT EMPLOYING A LINEAR DIGITAL FILTER

Filed July 28, 1964 2 Sheets-Sheet 1

INVENTOR
H. A. HELM
BY Lucian C. Canepa
ATTORNEY 3,358,083
Patented Dec. 12, 1967

3,358,083

TIME-DIVISION MULTIPLEX DIGITAL TRANSMISSION ARRANGEMENT EMPLOYING A LINEAR DIGITAL FILTER

Harry A. Helm, Morristown, N.J., assignor to Bell Telephone Laboratories, Incorporated, New York, N.Y., a corporation of New York Filed July 28, 1964, Ser. No. 385,565
14 Claims. (Cl. 178—50)

ABSTRACT OF THE DISCLOSURE

A digital data transmission system is proposed. Activation of selected ones of a set of sending stations causes the corresponding ones of a set of encoders to each generate a unique $n$-digit binary word. The words so generated are combined by an adder to form a composite $n$-digit representation that is transmitted to a receiving terminal having a set of stations respectively corresponding to the sending stations. The received representation is processed by a plurality of linear sequential networks that function as digital bandpass filters, whereby representations embodying selected subsets of the encoded $n$-digit words are routed via decoders to respective groups of the receiving stations.

Figure 1A:
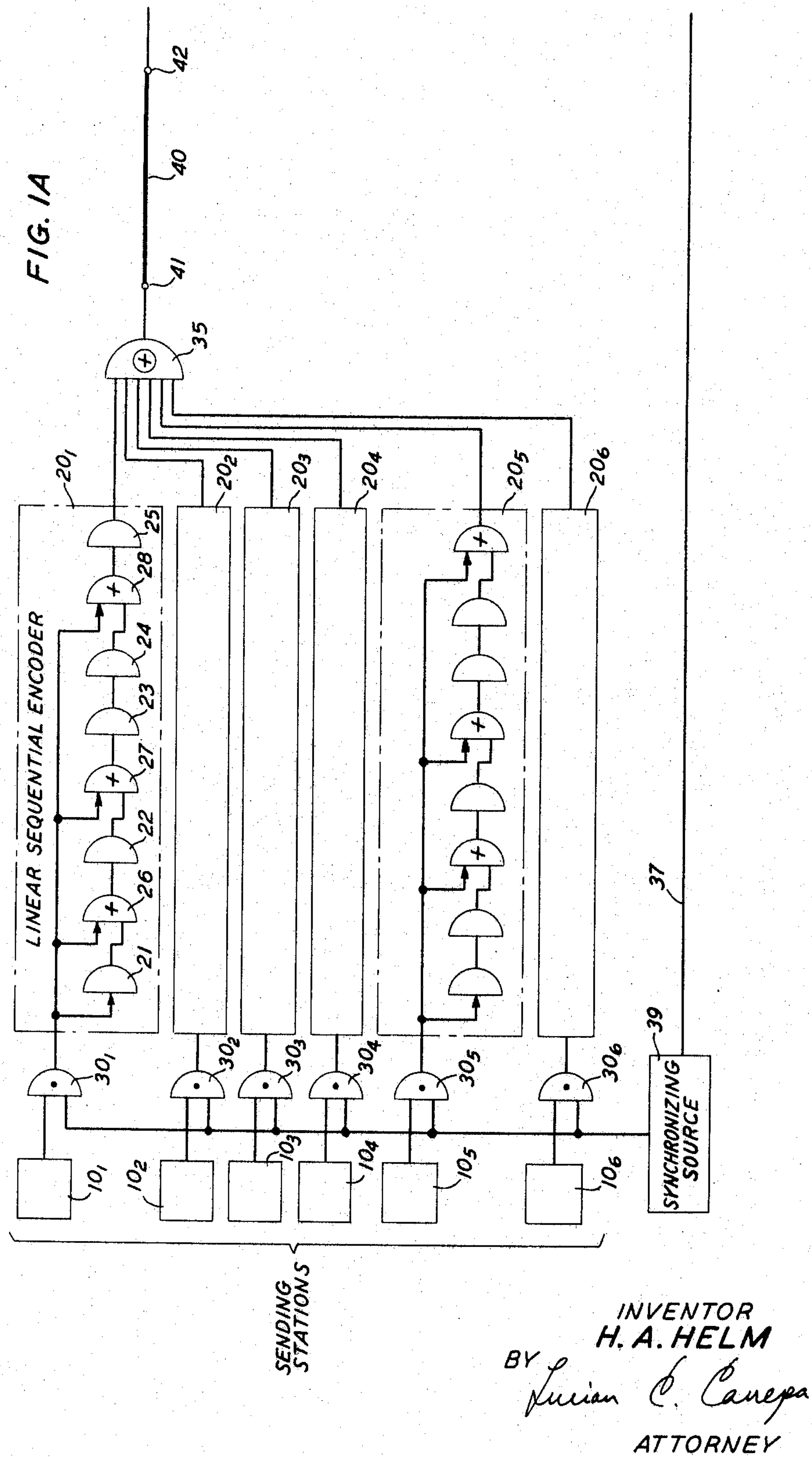

This invention relates to data processing arrangements and, more specifically, to a linear sequential filtering network for selectively passing multiplexed digital information.

In my cofiled application Ser. No. 385,564, there is described a time division digital transmission embodiment for selectively multiplexing a plurality of repetitively generated, characterstic digital words onto a common communication channel. At the output of the common link, a plurality of decoding circuit combinations detect the relative presence or absence of associated characteristic words in the transmitted digital message. The decoders then supply this information to corresponding receiving stations.

In some system applications, it is desirable to separate the composite binary digital signals on the common link into a preselected grouping pattern for purposes of special routing. Such is the case, for example, when a particular subset of receiving stations is geographically remote from the remainder of the receiving parties. Moreover, it may be further desirable for transmission privacy and/or security considerations that the signals sent to each receiving group exclude all information intended for a party not associated with that group. However, a linear sequential filtering network for selectively passing and suppressing desired subspaces of the multiplexed characteristic digital words in the manner described above has heretofore not been disclosed.

It is thus an object of the present invention to provide an arrangement for selectively filtering a multiplexed digital word.

More specifically, an object of the present invention is the provision of a linear sequential filtering network which selectively passes a predetermined subspace of a plurality of characteristic digital words, while suppressing the remainder of such words.

Another object of the present invention is the provision of a digital multiplexing system wherein messages may be grouped and routed in a secure, private manner.

Still another object of the present invention is the provision of a data processing arrangement which may advantageously be relatively simply and inexpensive constructed, and which is highly reliable.

These and other objects of the present invention are realized in a specific, illustrative data transmission arrangement adapted to selectively route input digital information. The arrangement includes $n$ digital sending stations each connected via an associated linear sequential encoder and a common modulo 2 adder to the input end of a transmission channel. A plurality of linear sequential filtering arrangements are connected through a series-to-parallel digital converter to the output end of the channel to selectively pass associated subspaces of the encoded digital words. Further, $n$ receiving stations, each communicating with a corresponding sending station, are joined to the output terminals of the associated filtering arrangements via a plurality of linear sequential decoders.

Responsive to a binary "1" information signal supplied thereto by the associated sending station, each encoder generates a unique, characteristic $n$-bit binary word. The signals so generated are processed by the adder and sequentially impressed on the common link.

At the output end of the channel, the filtering arrangements extract the appropriate grouping of signals from the composite multiplexed wave. These signals are then decoded and supplied to the designated receiving stations.

It is thus a feature of the present invention that a multiplexed digital processing system include a linear sequential filtering network connected to a common transmission channel for selectively passing and blocking desired subspaces of the multiplexed digital words.

It is another feature of the present invention that a digital transmission arrangement include a source for supplying up to $n$ unique, characteristic input digital words to the input end of a common transmission channel via a common modulo 2 adder, a linear digital filtering network connected to the output end of the channel for extracting desired subsets of the input digital words, and decoding circuitry for supplying binary information to a plurality of information receiving stations.

A complete understanding of the present invention, and of the above and other features, advantages and variations thereof may be gained from a consideration of the following detailed description of an illustrative embodiment thereof presented hereinbelow in conjunction with an accompanying drawing in which FIGS. 1A and 1B respectively comprise the left and right portions of a schematic diagram of an illustrative transmission and digital filtering arrangement made in accordance with the principles of the present invention.

Figure 1B:
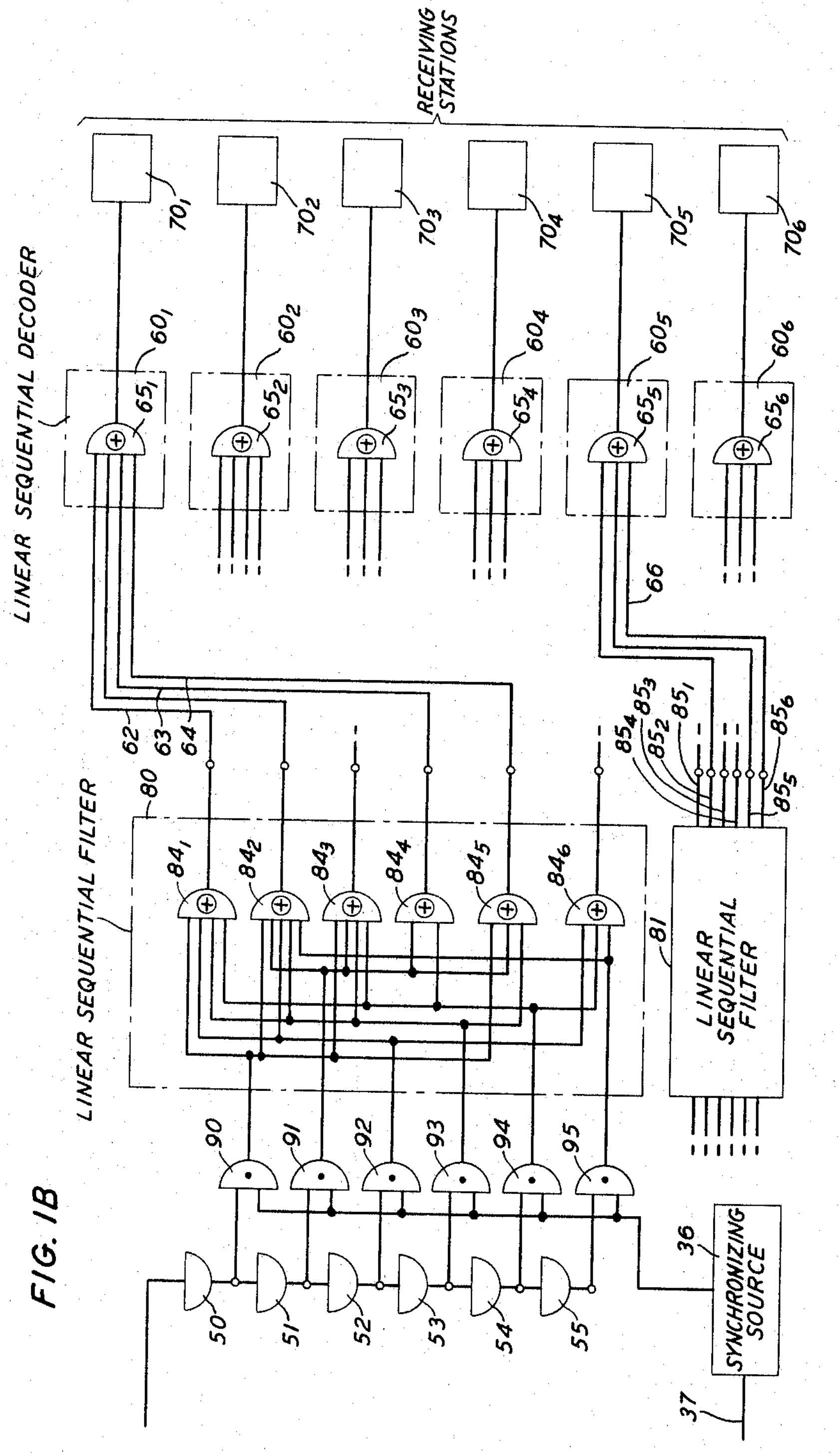

Referring now to FIGS. 1A and 1B, hereinafter referred to as composite FIG. 1, there is shown a specific, illustrative digital transmission system employing two linear sequential filters 80 and 81 to selectively route information included in a multiplexed binary word. The arrangement includes six digital sending stations $\mathbf{10}_1$ through $\mathbf{10}_6$ respectively connected by six AND logic gates $\mathbf{30}_1$ through $\mathbf{30}_6$ to a plurality of linear sequential encoders $\mathbf{20}_1$ through $\mathbf{20}_6$. A first synchronizing source 39 is included in the FIG. 1 arrangement to coincidentally enable each of the AND gates $\mathbf{30}_1$ through $\mathbf{30}_6$ at regularly recurring information sampling intervals each comprising six time slots.

Each linear sequential encoder $\mathbf{20}_k$ is adapted to respond to a binary "1" voltage signal supplied thereto by the corresponding AND gate $\mathbf{30}_k$ by supplying a unique, characteristic 6-bit binary word $v_k$ to an associated input terminal included on a modulo 2 adder gate 35. Modulo 2 gates are well known in the art, and perform Exclusive OR logic in respectively generating a "1" or "0" binary output signal responsive to an odd or even number of received binary "1" input signals. The six 6-bit binary words $v_k$ may advantageously comprise any consistent set of linear independent 6-tuples none of which is a cyclic permutation of any other. For concreteness, let the encoders $\mathbf{20}_1$ through $\mathbf{20}_6$ be functionally adapted to generate a set of characteristic digital words $v_1$ through $v_6$ wherein $$\begin{aligned} v_1&=1\,1\,1\,0\,1\,0\\ v_2&=0\,1\,0\,1\,0\,1\\ v_3&=1\,1\,0\,0\,0\,1\\ v_4&=0\,1\,1\,0\,1\,0\\ v_5&=1\,0\,1\,1\,0\,1\\ &\text{and}\\ v_6&=1\,1\,1\,0\,0\,1 \end{aligned} \tag{1}$$

with the digits being supplied in time in a right-to-left order. Thus, for example, the encoder $\mathbf{20_4}$ responds to a binary "1" signal supplied thereto by the station $\mathbf{10_4}$ via the gate $\mathbf{30_4}$ by supplying the digits 0, 1, 1, 0, 1 and 0 in reverse time order to adder 35. The particular structure embodying the encoders $\mathbf{20_1}$ through $\mathbf{20_6}$ is described in detail in my aforementioned cofiled application.

It is noted that selected 6-tuple digital words, including both the $v_k$ given above and other, later defined words, are interchangeably referred to as column matrices. In each case, the elements of the matrix array identically correspond to the digits of the associated binary word.

For purposes of fabricating the herinafter described decoding structure, it is necessary to define a matrix [P] whose columns comprises the ordered words $v_k$. That is, $$[P]=\begin{bmatrix} 1&0&1&0&1&1\\ 1&1&1&1&0&1\\ 1&0&0&1&1&1\\ 0&1&0&0&1&0\\ 1&0&0&1&0&0\\ 0&1&1&0&1&1 \end{bmatrix} \tag{2}$$

where the first through sixth columns of the matrix [P] respectively comprise $v_1$ through $v_6$. Since the words $v_1$ through $v_6$ are linearly independent, i.e., not derivable one from the other by an additive arithmetic operation, the matrix [P] is nonsingular and has an inverse $[P]^{-1}$ where $$[P]^{-1}=\begin{bmatrix} 1&1&0&1&1&0\\ 0&1&0&1&1&1\\ 0&1&1&1&0&0\\ 1&1&0&1&0&0\\ 0&1&0&0&1&1\\ 0&1&1&0&0&1 \end{bmatrix} \tag{3}$$

Equation 3 may be verified by inverting the matrix [P] by any of the plurality of well known techniques therefor, employing modulo 2 addition for all summations. As discussed hereinbelow, the rows of the matrix $[P]^{-1}$ define the specific interconnection pattern for six decoders $\mathbf{60_1}$ through $\mathbf{60_6}$ which extract the input intelligence from the digital signals passed by the filters 80 and 81.

The modulo 2 adder gate 35 has an output thereon connected to the input end 41 of a common communication link 40, with the output end 42 of the channel 40 being connected to six serially-connected delaying elements 50 through 55. Each of the elements 50 through 55 includes an output terminal thereon multipled, along with a synchronizing signal supplied by a synchronizing source 36, as enabling input signals to a corresponding one of a plurality of AND logic gates 90 through 95. The gates 50 through 55 are adapted to register at the output terminals thereon the six sequentially-transmitted digital bits which are impressed on the link 40 every information sampling cycle.

The two linear sequential filters 80 and 81 illustrated in FIG. 1 connect the AND gates 90 through 95 to a plurality of digital receiving stations $\mathbf{70_1}$ through $\mathbf{70_6}$ through a corresponding plurality of linear sequential decoders $\mathbf{60_1}$ through $\mathbf{60_6}$. It is noted that the stations $\mathbf{70_1}$ through $\mathbf{70_6}$ are illustrated in the FIG. 1 embodiment as respectively communicating with sending stations $\mathbf{10_1}$ through $\mathbf{10_6}$.

It will henceforth be assumed that for some desired purposes, e.g., geographical or security consideratiotns, the composite message on the link 40 is to be separated into two digital words which respectively embody only the intelligence destined for the receiving stations $\mathbf{70_1}$ through $\mathbf{70_3}$, and $\mathbf{70_4}$ through $\mathbf{70_6}$. Accordingly, the filters 80 and 81 are respectively adapted to pass the characteristic words generated by the encoders $\mathbf{20_1}$ through $\mathbf{20_3}$, and $\mathbf{20_4}$ through $\mathbf{20_6}$, while blocking the contribution of the other set of encoders.

To effect such a mode of operation, the filters 80 and 81 each comprise six modulo 2 adding gates which are selectively connected to the output terminals of the AND gates 90 through 95. To particularly determine the interconnection pattern for the gates included in the filters 80 and 81, it is required to first define two matrices $[Q]_{80}$ and $[Q]_{81}$ respectively associated therewith, wherein $$[Q]_{80}=[P][I^*]_{80}[P]^{-1} \tag{4}$$

and $$[Q]_{81}=[P][I^*]_{81}[P]^{-1} \tag{5}$$

The matrices $[I^*]_{80}$ and $[I^*]_{81}$ respectively included in Equations 4 and 5 each comprise a truncated identity matrix with a binary "1" appearing as the element on the main diagonal in the $k$th row and $k$th column of the filter is to pass the binary word associated with stations $\mathbf{10_k}$ and $\mathbf{70_k}$, and binary "0" entries appearing in all other positions. For the particular routing patterns chosen for illustration herein, $$[I^*]_{80}=\begin{bmatrix} 1&0&0&0&0&0\\ 0&1&0&0&0&0\\ 0&0&1&0&0&0\\ 0&0&0&0&0&0\\ 0&0&0&0&0&0\\ 0&0&0&0&0&0 \end{bmatrix}$$

and $$[I^*]_{81}=\begin{bmatrix} 0&0&0&0&0&0\\ 0&0&0&0&0&0\\ 0&0&0&0&0&0\\ 0&0&0&1&0&0\\ 0&0&0&0&1&0\\ 0&0&0&0&0&1 \end{bmatrix} \tag{6}$$

The desired matrices $[Q]_{80}$ and $[Q]_{81}$ may thus be computed from Equations 4 and 5 such that $$[Q]_{80}=\begin{bmatrix} 1&0&1&0&1&1\\ 1&1&1&1&0&1\\ 1&0&0&1&1&1\\ 0&1&0&0&1&0\\ 1&0&0&1&0&0\\ 0&1&1&0&1&1 \end{bmatrix}\begin{bmatrix} 1&0&0&0&0&0\\ 0&1&0&0&0&0\\ 0&0&1&0&0&0\\ 0&0&0&0&0&0\\ 0&0&0&0&0&0\\ 0&0&0&0&0&0 \end{bmatrix}\begin{bmatrix} 1&1&0&1&1&0\\ 0&1&0&1&1&1\\ 0&1&1&1&0&0\\ 0&1&1&1&0&0\\ 0&1&0&0&1&1\\ 0&1&1&0&0&1 \end{bmatrix}=\begin{bmatrix} 1&0&1&1&1&0\\ 1&1&1&1&0&1\\ 1&1&0&1&1&0\\ 0&1&0&0&1&1\\ 1&1&0&1&1&0\\ 0&0&1&0&1&1 \end{bmatrix}$$

and $$[Q]_{81}=\begin{bmatrix} 1&0&1&0&1&1\\ 1&1&1&1&0&1\\ 1&0&0&1&1&1\\ 0&1&0&0&1&0\\ 1&0&0&1&0&0\\ 0&1&1&0&1&1 \end{bmatrix}\begin{bmatrix} 0&0&0&0&0&0\\ 0&0&0&0&0&0\\ 0&0&0&0&0&0\\ 0&0&0&1&0&0\\ 0&0&0&0&1&0\\ 0&0&0&0&0&1 \end{bmatrix}\begin{bmatrix} 1&1&0&1&1&0\\ 0&1&0&1&1&1\\ 0&1&1&1&0&0\\ 0&1&1&1&0&0\\ 0&1&0&0&1&1\\ 0&1&1&0&0&1 \end{bmatrix}=\begin{bmatrix} 0&0&1&0&1&0\\ 1&0&1&1&0&1\\ 1&1&1&1&1&0\\ 0&1&0&0&1&1\\ 1&1&0&1&0&0\\ 0&0&1&0&1&0 \end{bmatrix} \tag{7}$$

It is noted at this point that all additions encompassed within the scope of the present invention, including both matrix and digital arithmetic operations, are performed on a modulo 2 basis.

With $[Q]_{80}$ and $[Q]_{81}$ defined above, the interconnection pattern for the modulo 2 adder gates included in the filters 80 and 81 is fully determined. With particular reference to the filter 80, the modulo 2 adders $\mathbf{84_1}$ through $\mathbf{84_6}$ included therein are connected to the output terminals of the AND gates 90 through 95 when binary "1's" appear in the corresponding row and column of matrix $[Q]_{80}$, and not connected when "0's" there appear. This set of circuit interconnections is listed in Table I infra, wherein a binary "1" or "0" entry respectively indicates a connection or no connection between a modulo 2 gate 84 and the corresponding AND gate.

TABLE I

| Modulo 2 Gate | AND Gate | | | | | |
|---|---|---|---|---|---|---|
| | 90 | 91 | 92 | 93 | 94 | 95 |
| $84_1$ | 1 | 0 | 1 | 1 | 1 | 0 |
| $84_2$ | 1 | 1 | 1 | 1 | 0 | 1 |
| $84_3$ | 1 | 1 | 0 | 1 | 1 | 0 |
| $84_4$ | 0 | 1 | 0 | 0 | 1 | 1 |
| $84_5$ | 1 | 1 | 0 | 1 | 1 | 0 |
| $84_6$ | 0 | 0 | 1 | 0 | 1 | 1 |

As indicated hereinabove, the digital pattern depicted in Table I identically corresponds to the matrix array $[Q]_{80}$.

In a similar manner, the filter 81 comprises six modulo 2 adder gates connected in accordance with the matrix $[Q]_{81}$. However, to preserve the clarity of FIG. 1, the filter 81 is simply illustrated in block diagram form with six output leads 85$_1$ through 85$_6$ included therein comprising the outputs of the six modulo 2 adder gates included in the filter 81. As described hereinafter, the filters 80 and 81 respectively perform the matrix multiplications $$[Q]_{80}\sum_{k}[v_k]$$

and $$[Q]_{81}\sum_{k}[v_k]$$

where the latter term in each case represents the sum of the selectively generated characteristic words $v_k$ added by the gate 35 and supplied to the common channel 40.

Finally, six linear sequential decoders 60$_1$ through 60$_3$ and 60$_4$ through 60$_6$ are included in the FIG. 1 arrangement to respectively connect the filters 80 and 81 to the receiving stations 70$_1$ through 70$_3$, and 70$_4$ through 70$_6$. Each decoder 60 comprises a modulo 2 adder gate 65 having a plurality of input terminals thereon selectively connected to the associated filter 80 or 81 in accordance with the corresponding row of the matrix $[P]^{-1}$. More specifically, the decoding modulo 2 gates 65$_1$ through 65$_6$ are connected to the modulo 2 gates included in the corresponding filter 80 or 81 when binary "1's appear in the corresponding row and column of the matrix $[P]^{-1}$, and not connected when "0's" thereappear. This system of circuit interconnections is listed in Table II infra, wherein a binary "1" or "0" entry respectively indicates a connection or no connection between a decoding modulo 2 gate 65 and the corresponding filtering gate 84 or output lead 85, as appropriate.

TABLE II

| Modulo 2 Gate | Modulo 2 Gate or Output Lead, as Appropriate | | | | | |
|---|---|---|---|---|---|---|
| | $84_1$ or $85_1$ | $84_2$ or $85_2$ | $84_3$ or $85_3$ | $84_4$ or $85_4$ | $84_5$ or $85_5$ | $84_6$ or $85_6$ |
| $65_1$ | 1 | 1 | 0 | 1 | 1 | 0 |
| $65_2$ | 0 | 1 | 0 | 1 | 1 | 1 |
| $65_3$ | 0 | 1 | 1 | 1 | 0 | 0 |
| $65_4$ | 1 | 1 | 0 | 1 | 0 | 0 |
| $65_5$ | 0 | 1 | 0 | 0 | 1 | 1 |
| $65_6$ | 0 | 1 | 1 | 0 | 0 | 1 |

Note that the digital array included in Table II identically corresponds to the matrix $[P]^{-1}$ given by Equation 3. As described hereinafter, the $k$th decoder 60$_k$ is functionally adapted to perform the vector multiplication $$[P_k]^{-1}\sum_{k}[v_k]$$

where $[P_k]^{-1}$ represents the $k$th row of the matrix $[P]^{-1}$, and the latter term is the filtered sum of the selectively generated characteristic words $v_k$ which are passed by the appropriate filtering embodiment 80 or 81. For purposes of preserving the clarity of FIG. 1, only the connections for the gates 65$_1$ and 65$_5$ are shown in detail therein.

With the above organization in mind, a typical sequence of circuit operation for the FIG. 1 arrangement will now be described. Assume now that the sending stations 10$_1$, 10$_2$ and 10$_5$ are transmitting binary "1" information digits to the receiving stations 70$_1$, 70$_2$ and 70$_5$, while the remaining stations 10$_3$, 10$_4$ and 10$_6$ are sending binary "0's" to the associated receiving stations 70$_3$, 70$_4$ and 70$_6$.

When the source 39 sends the next recurring word synchronizing pulse to the AND gates 30$_1$ through 30$_6$, the binary "1" voltage pulses supplied by the stations 10$_1$, 10$_2$ and 10$_5$ are passed to the encoders 20$_1$, 20$_2$ and 20$_5$, while "0" signals are detected by the encoders 20$_3$, 20$_4$ and 20$_6$. Responsive to this set of circuit conditions, the encoders 20$_3$, 20$_4$ and 20$_6$ are inactive and do not generate the words $v_3$, $v_4$ and $v_6$ associated therewith. However, the encoders 20$_1$, 20$_2$ and 20$_5$ are enabled and these circuit combinations transmit the characteristic words $v_1$, $v_2$ and $v_5$, viz, 111010, 010101, and 101101 to the adder 35, with the right-hand digits being generated first. The modulo 2 adder 35 performs Exclusive OR logic on a digit-by-digit basis upon the received digital words $v_1$, $v_2$ and $v_5$, and impresses the composite digital word $w$ on the link 40, where $$[w]=\sum_{k=1,2,5}[v_k]=\begin{bmatrix}1\\1\\1\\0\\1\\0\end{bmatrix}+\begin{bmatrix}0\\1\\0\\1\\0\\1\end{bmatrix}+\begin{bmatrix}1\\0\\1\\1\\0\\1\end{bmatrix}=\begin{bmatrix}0\\0\\0\\0\\1\\0\end{bmatrix} \tag{8}$$

with a word $w$ being written in its alternative notation as a column matrix.

Examining the above encoded process in generalized terms, let the unencoded information signals generated by the $k$th station 10$_k$ be represented by a vector $[s_k]$, where $[s_k]$ is a column matrix with the information "1" or "0" bit ($\alpha_k$) in the $k$th row, and "0's" elsewhere. Further, let a column vector $[m]$ represent the composite message sent by the six sending stations 10$_1$ through 10$_6$, such that $$[m]=\sum_{k=1}^{6}[s_k]=\begin{bmatrix}\alpha_1\\\alpha_2\\\alpha_3\\\alpha_4\\\alpha_5\\\alpha_6\end{bmatrix} \tag{9}$$

Since the $k$th column of $[P]$ is $v_k$, when $\alpha_k$ is a "1" it is observed that $$[P][s_k]=[v_k] \tag{10}$$

In addition, the 6-bit multiplexed word $w$ on the link 40, when written in matrix form, is given by $$[w]=\sum_{k}[v_k] \tag{11}$$

where the indefinite summation runs over all the $v_k$ which are selectively generated by the encoders 20$_1$ through 20$_6$. Employing the relationships set forth in Equations 9 and 10 in Equation 11, note that $$[w]=\sum_{k}[v_k]=[P]\sum_{k=1}^{6}[s_k]=[P][m] \tag{12}$$

For the particular message assumed above, viz., $$[m]=\begin{bmatrix}1\\1\\0\\0\\1\\0\end{bmatrix} \tag{13}$$

it may readily be seen that the operation indicated in Equation 12, i.e., $$[w]=[P][m]=\begin{bmatrix}1&0&1&0&1&1\\1&1&1&1&0&0\\1&0&0&1&1&1\\0&1&0&0&1&0\\1&0&0&1&0&0\\0&1&1&0&1&1\end{bmatrix}\begin{bmatrix}1\\1\\0\\0\\1\\0\end{bmatrix}=\begin{bmatrix}0\\0\\0\\0\\1\\0\end{bmatrix} \tag{14}$$

yields a result in accord with that derived above in Equation 8, from purely circuit considerations, for the digital word impressed on the link 40.

The binary word 000010 on the link 40 is sequentially translated down the delaying chain comprising the elements 50 through 55 such that the digits, 0, 0, 0, 0, 1 and 0 respectively reside at the output terminals of the gates 50 through 55 after the six delaying intervals which comprise one information bit transmission cycle. After the time corresponding to six time slots has elapsed, the synchronizing sources 36 and 39, in combination with a synchronizing lead 37, generate a pulse indicative of a new transmission cycle. The pulse supplied by the source 39 initiates a new information sampling cycle in the manner described above, while the energization generated by the source 36 is functionally adapted to enable the AND gates 90 through 95, thereby passing the digital pattern present at the output terminals of the delaying elements 50 through 55 through the AND gates 90 through 95 for filtering purposes.

In over-all conceptual terms the filter 80, which was constructed in accordance with the matrix $[Q]_{80}$, performs the matrix operation $$[Q]_{80}\sum_{k}[v_k]=[Q]_{80}[w]=[P][I^*]_{80}[P]^{-1}[w] \tag{15}$$

By substituting Equation 10 into Equation 15 it is apparent that $$[P][I^*]_{80}[P]^{-1}\sum_{k}[v_k]=[P][I^*]_{80}[P]^{-1}[P]\sum_{k=1}^{6}[s_k]=[P][I^*]_{80}\sum_{k=1}^{6}[s_k] \tag{16}$$

However, note that $$[I^*]_{80}\sum_{k=1}^{6}[s_k]=\begin{bmatrix}1&0&0&0&0&0\\0&1&0&0&0&0\\0&0&1&0&0&0\\0&0&0&0&0&0\\0&0&0&0&0&0\\0&0&0&0&0&0\end{bmatrix}\begin{bmatrix}\alpha_1\\\alpha_2\\\alpha_3\\\alpha_4\\\alpha_5\\\alpha_6\end{bmatrix}=\begin{bmatrix}\alpha_1\\\alpha_2\\\alpha_3\\0\\0\\0\end{bmatrix} \tag{17}$$

Thus, as illustrated for the filter 80 in Equation 17, $$[I^*]_{80}[s_k]=[\alpha_k] \text{ if } 1\leq k\leq 3$$

and $$=0 \text{ if } 4\leq k\leq 6 \tag{18}$$

Hence, letting $[r]_{80}$ be the output digital signals derived from the filter 80, $$[r]_{80}=[P]\sum_{k=1}^{3}[s_k]=\sum_{k\neq 4,5,6}[v_k] \tag{19}$$

where $[r]_{80}$ is a column matrix whose element corresponds to the digital pattern appearing at the output terminals of the modulo 2 gates $\mathbf{84}_1$ through $\mathbf{84}_6$, respectively. It may be observed from Equation 19 that the filter 80 is adapted to pass only the desired words $v_k$ generated by the associated encoders $\mathbf{20}_1$ through $\mathbf{20}_3$, while excluding all such signals included in the multiplexed word $w$ which were contributed by the encoders $\mathbf{20}_4$ through $\mathbf{20}_6$.

In the specific example herein considered, Equation 15 yields $$[r]_{80}=[Q]_{80}[w]=\begin{bmatrix}1&0&1&1&1&0\\1&1&1&1&0&1\\1&1&0&1&1&0\\0&1&0&0&1&1\\1&1&0&1&1&0\\0&0&1&0&1&1\end{bmatrix}\begin{bmatrix}0\\0\\0\\0\\1\\0\end{bmatrix}=\begin{bmatrix}1\\0\\1\\1\\1\\1\end{bmatrix} \tag{20}$$

Note that this is precisely the desired result which is obtained by simply adding the characteristic words $v_1$ and $v_2$, i.e., $$[r]_{80}=\begin{bmatrix}1\\1\\1\\0\\1\\0\end{bmatrix}+\begin{bmatrix}0\\1\\0\\1\\0\\1\end{bmatrix}=\begin{bmatrix}1\\0\\1\\1\\1\\1\end{bmatrix} \tag{21}$$

With regard to the particular structure shown in FIG. 1, note, as discussed hereinabove, that the binary digits 0, 0, 0, 0, 1 and 0 appear at the output terminals of the AND gates 90 through 95 during the time interval just following the enabling pulse supplied by the synchronizing source 36. The sole binary "1" signal at the output terminal of the gate 94 is supplied to the gates $\mathbf{84}_1$, $\mathbf{84}_3$, $\mathbf{84}_4$, $\mathbf{85}_5$ and $\mathbf{86}_6$ connected thereto. Responsive to the aforementioned input energization pattern supplied to the modulo 2 gates 84, the outputs of the gates $\mathbf{84}_1$ through $\mathbf{84}_6$ generate the binary output pattern 101111, which corresponds to the matrix $[r]_{80}$ and is in accord with the analytical analysis given above.

In the particular example under consideration, the filter 80 has therefore correctly passed the sum of the $v_1$ and $v_2$ signals generated responsive to the binary "1" signals supplied by the sending stations $\mathbf{10}_1$ and $\mathbf{10}_2$, while suppressing the word $v_5$ which was generated responsive to the binary "1" signal supplied by the station $\mathbf{10}_5$.

In a manner identically paralleling the above discussion, the filter 81 generates an output matrix $[r]_{81}$ where $$[r]_{81}=[Q]_{81}\sum_{k}[v_k]=[Q]_{81}[w]=\sum_{k\neq 1,2,3}[v_k] \tag{22}$$

wherein $[r]_{81}$ is a column matrix whose elements correspond to the digital pattern appearing at the filter output leads $\mathbf{85}_1$ through $\mathbf{85}_6$. For the assumed input signaling conditions under consideration, $$[r]_{81}=[Q]_{81}[w]=\begin{bmatrix}0&0&1&1&1&0\\1&0&1&1&0&1\\1&1&1&1&1&0\\0&1&0&0&1&1\\1&1&0&1&0&0\\0&0&1&0&1&0\end{bmatrix}\begin{bmatrix}0\\0\\0\\0\\1\\0\end{bmatrix}=\begin{bmatrix}1\\0\\1\\1\\0\\1\end{bmatrix} \tag{23}$$

As is appropriate, the result shown in Equation 23 is simply the column vector $[v_5]$, which is the only contribution of the encoders $\mathbf{20}_4$ through $\mathbf{20}_6$ to the composite word $[w]$ appearing on the common channel 40. Thus, the filter 81 passes only the word $v_5$ included in the subset $v_4$, $v_5$ and $v_6$, while suppressing the contributions to the multiplexed word $w$ resulting from the energized encoders $\mathbf{20}_1$ and $\mathbf{20}_2$.

In general terms, the decoders $\mathbf{60}_1$ through $\mathbf{60}_3$ are constructed in accordance with the matrix $[P]^{-1}$ to respectively separate the word $[r]_{80}$ passed by the filter 80 into the particular intelligence bits originally generated by the sending stations $\mathbf{10}_1$ through $\mathbf{10}_3$. In particular, the decoders $\mathbf{60}_1$ through $\mathbf{60}_3$ are connected to effect the matrix multiplication $[P]^{-1}[r]_{80}$. However, it is observed from Equations 10 and 19 that $$[P]^{-1}[r]_{80}=[P]^{-1}\sum_{k\neq 4,5,6}[v_k]=[P]^{-1}\cdot[P]\cdot\sum_{k=1}^{3}[s_k]=\sum_{k=1}^{3}[s_k]=\begin{bmatrix}\alpha_1\\\alpha_2\\\alpha_3\\0\\0\\0\end{bmatrix} \tag{24}$$

Thus, the decoders $\mathbf{60}_1$ through $\mathbf{60}_3$ are operative to extract the original information bits $\alpha_1$, $\alpha_2$ and $\alpha_3$ from the composite digital word appearing at the output of the filter 80.

Each specific decoder 60 is adapted to represent only a single, corresponding row of the matrix $[P]^{-1}$. Considering $[P_k]^{-1}$ as the $k$th row of $[P]^{-1}$, the decorder $\mathbf{60}_k$ performs the matrix multiplication $$[P_k]^{-1}[r]_{80}=\alpha_k \tag{25}$$

thereby supplying the input information digit $\alpha_k$ to the receiving station $\mathbf{70}_k$. Applying Equation 25 to the specific example chosen for illustration, and examining the operation of the decoding modulo 2 gate $\mathbf{65}_1$, note that this gate performs the matrix multiplication $$[P_1]^{-1}[r]_{80}=[110110]\begin{bmatrix}1\\0\\1\\1\\1\\1\end{bmatrix}=1+0+0+1+1+0=\alpha_1=1 \tag{26}$$

thereby supplying the input digital "1" signal, generated by the sending station $\mathbf{10}_1$, to the receiving station $\mathbf{70}_1$.

Examining the particular structure associated with the decoding gate $\mathbf{65}_1$, note that the three binary "1" digits appearing in the sum indicated in Equation 26 are supplied thereto via three energized decoding input leads 62, 63 and 64 illustrated in FIG. 1. The gate $\mathbf{65}_1$ performs a modulo 2 sum over the three binary "1" input digits, and supplies the correct $\alpha_1$ information digit (a binary "1") to the receiving station $\mathbf{70}_1$.

In a similar manner, the remaining decoding gates $65_2$ and $65_3$ perform the matrix operations $$[P_2]^{-1}[r]_{80}=[010111]\begin{bmatrix}1\\0\\1\\1\\1\\1\end{bmatrix}=0+0+0+1+1+1=\alpha_2=1 \quad (27)$$

and $$[P_3]^{-1}[r]_{80}=[011100]\begin{bmatrix}1\\0\\1\\1\\1\\1\end{bmatrix}=0+0+1+1+0+0=\alpha_3=0 \quad (28)$$

thereby respectively supplying the desired "1" and "0" information bits to the receiving stations $70_2$ and $70_3$.

In a corresponding fashion, the decoders $60_4$ through $60_6$ extract the information which is to be conveyed to the stations $70_4$ through $70_6$. In particular, modifying Equation 25 to relate to the filter output signal matrix $[r]_{81}$, the decoding gates $65_4$ through $65_6$ perform the matrix multiplications $$[P_4]^{-1}[r]_{81}=[110110]\begin{bmatrix}1\\0\\1\\1\\0\\1\end{bmatrix}=1+0+0+1+0+0=\alpha_4=0 \quad (29)$$

$$[P_5]^{-1}[r]_{81}=[010011]\begin{bmatrix}1\\0\\1\\1\\0\\1\end{bmatrix}=0+0+0+0+0+1=\alpha_5=1 \quad (30)$$

and $$[P_6]^{-1}[r]_{81}=[011001]\begin{bmatrix}1\\0\\1\\1\\0\\1\end{bmatrix}=0+0+1+0+0+1=\alpha_6=0 \quad (31)$$

Thus it is observed that the proper information digits are supplied by the decoders $60_4$ through $60_6$ to the corresponding receiving stations $70_4$ through $70_6$.

Regarding the binary sum associated with the decoder $60_5$ given by Equation 30, note that the single binary "1" included therein is supplied to the gate $65_5$ by an input lead 66 shown in FIG. 1, which lead is connected to the energized output leads $85_6$ included on the filter 81. The gate $65_5$ operates on this single input energization by supplying the required binary "1" signal to the associated receiving source $70_5$.

The FIG. 1 arrangement continuously responds to successive pulses supplied by the synchronizing sources 36 and 39 by iteratively operating in the above-described mode to transmit new sets of information digits from the sending stations $10_1$ through $10_6$ to the corresponding receiving stations $70_1$ through $70_6$ in accordance with the routing pattern determined by the digital filters 80 and 81. In this regard, the filters 80 and 81 have been shown to function as digital filtering embodiments by selectively passing desired subspaces of the input characteristic words embodied in the multiplexed binary digits appearing on the common channel 40, while suppressing the remainder of the encoded words.

Moreover, it is noted at this point that the linear sequential filtering arrangements 80 and 81 are general circuit combinations, and may be employed to selectively pass a desired subset of applied digital words in any type of data processing application.

It is to be understood that the above-described arrangement is only illustrative of the application of the principles of the present invention. Numerous other arrangements may be devised by those skilled in the art without departing from the spirit and scope of the present invention. For example, while characteristic encoded words of six bits were employed for purposes of illustration, the words might have advantageously been of any particular length. Further, other series-to-parallel digital converters may be employed in place of the delaying gates 50 through 55. In addition, the digital filtering arrangements 80 and 81 may be employed with a source which selectively supplies thereto only one of a plurality of characteristic digital words. Such a source may comprise, for example, a teletypewriter or a computer command decoder.

What is claimed is:

1. In combination, a transmission channel, a first modulo 2 adder connected to the input end of said channel, means for selectively supplying a plurality of unique, characteristic input digital words to said adder, each of said words comprising the same number of digit positions, and digital filtering means connected to the other end of said channel for passing a digital word representative of the modulo 2 addition of less than the full plurality of said input digital words.

2. A combination as in claim 1, further including a plurality of linear sequential decorders connected to said filtering means.

3. A combination as in claim 2, further comprising a plurality of information receiving means respectively connected to said decoders.

4. A combination as in claim 3, wherein said filtering means comprises a multistage series-to-parallel digital converter and a plurality of modulo 2 gates selectively connected to said converter stages.

5. A combination as in claim 4, wherein said series-to-parallel digital converter includes a plurality of series-connected delaying arrangements.

6. A combination as in claim 5, wherein said input word supplying means comprises a plurality of binary information sources and a like plurality of linear sequential encoders respectively connected thereto, said combination further comprising a first plurality of AND logic gates respectively interposed between said input sources and said encoders, a second plurality of AND logic gates respectively interposed between said series-to-parallel converter stages and said plurality of modulo 2 gates, first and second synchronizing means for respectively enabling said first and second plurality of AND logic gates, and means for synchronizing said synchronizing sources.

7. In combination, means for selectively supplying a plurality of unique, characteristic digital words each comprising $n$ digit positions, where $n$ is any positive integer greater than one, means for time multiplexing said digital words to form a composite $n$-bit word, and filter means connected to said multiplexing means for selectively passing a digital word representative of the multiplexing of less than the full plurality of said supplied words while suppressing the contribution to the representation provided by said multiplexing means of the remaining ones of said plurality of supplied word.

8. A combination as in claim 7, wherein said filter means and said multiplexing means each comprise Exclusive OR logic means.

9. In combination, means for selectively generating up to $n$ $n$-bit unique, characteristic, linearly independent digital words $v_k$, where $n$ is any positive integer greater than one and $k$ runs from zero to $n$, a common transmission link, a modulo 2 adder connecting said word generating means to one end of said link, and digital filter means connected to the other end of said link for passing a digital word representative of the modulo 2 addition of only a predetermined number of the words generated by said generating means.

10. A combination as in claim 9, wherein said filter means includes a multistage series-to-parallel converter and $n$ modulo 2 logic gates selectively connected thereto in accordance with corresponding rows of matrix [Q] where $$[Q]=[P][I^*][P]^{-1}$$

wherein [P] includes ordered columns comprising said digital words $v_k$, and $[I^*]$ comprises the identity matrix with selected elements on the main diagonal having a value of "0."

11. A combination as in claim 10, further comprising a plurality of linear sequential decoders connected to said filtering means for performing the matrix multiplication $[P]^{-1}$ $[r]$, where $[r]$ comprises the output signals generated by said filtering means.

12. In combination, a plurality of encoding means for selectively generating digital words which correspond to the columns of a matrix [P], a modulo 2 adder connected to each of said encoding means for transmitting an output digital word corresponding to the modulo 2 sum of the input characteristic binary words supplied thereto, and filtering means connected to said adder for matrix multiplying said output word by a matrix [Q], where $$[Q]=[P][I^*][P]^{-1}$$

where $[I^*]$ is the identity matrix with selected elements on the main diagonal having a "0" value.

13. In combination, a circuit terminal, encoding means connected to said terminal for selectively supplying thereto one of a plurality of digital words corresponding to the columns of a matrix [P], registering means connected to said terminal for registering said selectively supplied word, and linear sequential filtering means connected to said registering means for selectively passing said selectively supplied digital word only if it is one of a preselected number of said plurality of digital words.

14. A combination as in claim 13 wherein said filtering means includes means for matrix multiplying said selectively supplied word by a matrix [Q], where $$[Q]=[P][I^*][P]^{-1}$$

with $[I^*]$ comprising the identity matrix with selected elements on the main diagonal having a "0" value.

References Cited

UNITED STATES PATENTS

| | | | |
|---|---|---|---|
| 3,259,693 | 7/1966 | Watanabe | 179—15 |
| 3,259,695 | 7/1966 | Murakami | 179—15 |

ROBERT L. GRIFFIN, *Acting Primary Examiner.*

JOHN W. CALDWELL, *Examiner.*

J. T. STRATMAN, *Assistant Examiner.*